United States Patent [19]

Sigg

[11] 4,255,981

[45] Mar. 17, 1981

[54] MARINE REVERSING GEARING

[75] Inventor: Hans Sigg, Mutschellen, Switzerland

[73] Assignee: Maag Gear-Wheel & Machine Company, Limited, Zürich, Switzerland

[21] Appl. No.: 919,045

[22] Filed: Jun. 26, 1978

[30] Foreign Application Priority Data

Jul. 15, 1977 [CH] Switzerland ............... 8790/77

[51] Int. Cl.³ .............................................. F16H 37/06
[52] U.S. Cl. .................................................. 74/665 A
[58] Field of Search ......... 74/665 F, 665 G, 665 GA, 74/413

[56] References Cited

U.S. PATENT DOCUMENTS

| | | | |
|---|---|---|---|
| 2,833,382 | 5/1958 | Murray et al. | 74/665 GA X |
| 3,922,997 | 12/1975 | Jameson | 74/665 GA X |
| 4,023,418 | 5/1977 | Zenker | 74/665 GA X |
| 4,024,935 | 5/1977 | Sugimoto | 74/665 GA X |

Primary Examiner—Werner H. Schroeder
Attorney, Agent, or Firm—Werner W. Kleeman

[57] ABSTRACT

A marine reversing gearing having a forward clutch which is coaxially arranged with respect to a drive shaft. A pinion of a first gearing stage or train can be coupled with the drive shaft by means of the forward clutch. Two mutually parallel gears of the first stage continuously mesh with the pinion of the first stage. A power take-off shaft can be driven by means of both gears of a second gearing stage or train. There is also provided a set of reversing gears composed of a number of reversing gears and at least one reverse clutch which is likewise coaxially arranged with regard to the drive shaft. The set of reversing gears can be coupled with the pinion of the first gearing stage by said at least one reverse clutch. For engaging and disengaging the forward and reverse clutches a slowly rotating auxiliary drive having reversible direction of rotation is connected by means of a reverse movement blocking device with the drive shaft.

7 Claims, 2 Drawing Figures

MARINE REVERSING GEARING

CROSS-REFERENCE TO RELATED CASE

This application is related to the commonly assigned, copending United States application Ser. No. 941,989, filed Sept. 13, 1978, entitled "MARINE REVERSING GEARING", and listing as the inventor Hans Sigg.

BACKGROUND OF THE INVENTION

The present invention relates to a new and improved construction of marine reversing gearing or power transmission system for vessels or the like.

The marine reversing gearing of the present invention is of the type comprising a drive shaft, a forward clutch arranged essentially coaxially with respect to the drive shaft, a pinion of a first gearing stage or train which can be coupled by means of the forward clutch with the drive shaft, and two mutually parallel gears of the first gearing stage which are continuously in meshing engagement with the pinion of the first stage. Further, there is provided a power take-off shaft which is drivable by means of both gears of the first stage. Also there is provided a set of reversing gears composed of a number of reversing gears and at least one reverse clutch which likewise is coaxially arranged with respect to the drive shaft. With the forward clutch disengaged there is established a connection incorporating the set of reversing gears between the drive shaft and the gears of the first gearing stage.

Now with a state-of-the-art marine reversing gearing of this type, for instance as disclosed in U.S. Pat. No. 2,741,351, particularly FIGS. 3, 4 and 5, there is provided for the forward and rearward travel a respective first gearing stage each having its own pinion. Both of these pinions each independently mesh with two mutually parallelly mounted gears of the first stage which are rigidly connected with a respective pinion of the second gearing stage. Meshing with both pinions of the second stage is a common gear of the second stage which is rigidly connected by means of a power take-off shaft with a propeller of the ship. The pinion of the first stage provided for the forward or ahead travel is capable of being directly coupled or clutched by means of a forward clutch with a turbine driven-drive shaft. The pinion of the first stage provided for the rearward or astern travel is mounted parallel to the drive shaft and can be coupled by means of a first reverse clutch with a peripheral reversing gear and such meshes with a central reversing gear which is coaxially mounted with regard to the drive shaft. The central reversing gear, in turn, can be coupled by means of a second reverse clutch with the drive shaft. The mentioned clutches can be conjointly activated in such a manner that during disengagement of the forward clutch both of the reverse clutches are engaged, and conversely, during disengagement of both of the reverse clutches the forward clutch is engaged. There are used as the clutches simple dog or jaw clutches which are equipped with friction disks or self-synchronizing jaw clutches.

What has been found to be disadvantageous with such type arrangements is that in the case of dog or jaw clutches oftentimes the relative position of the teeth of the clutch which is to be engaged is such that the tooth gap and related tooth to be engaged do not coincide. Consequently, the clutch only then can be first engaged when the counter clutch—the forward or reverse clutch—has been completely disengaged.

However, this leads to the result that the drive turbine must be decoupled and therefore accelerated in rotational direction. In the case of rapidly accelerating gas turbines there therefore exists the danger that either the clutch which is to be engaged has too little time for engagement, or, however, the ends of the teeth which are to be engaged become damaged.

In FIG. 13 of the aforementioned U.S. Pat. No. 2,741,351 there is taught an arrangement employing self-synchronizing clutches which presupposes an absolute standstill of the shaft system, in order to avoid damage to the synchronization mechanism of the clutch which is to be engaged. This absolute standstill of the entire system only can be obtained with great difficulty and a reliable control of the operating state of the system requires the employment of considerable constructional means. Therefore, automation of the reversing operation is quite complicated and expensive.

A further drawback of a great many of the state-of-the-art reverse gearing or transmissions is the fact that such only can be coupled or clutched when the rotational moment of the turbine is greater than the negative propeller torque or rotational moment. This means that drive units must be available which can be rearwardly driven.

SUMMARY OF THE INVENTION

Hence, it is a primary object of the present invention to provide a new and improved construction of marine reversing gearing or power transmission system which is not associated with the aforementioned drawbacks and limitations of the prior art proposals.

Another and more specific object of the present invention aims at the provision of a marine reversing gearing which can be readily supervised and also runs as quietly as possible at high drive rotational speeds and drive output with power branch-off in the first gearing stage, and while avoiding the aforementioned drawbacks.

Still a further significant object of the present invention resides in the provision of a new and improved construction of marine reversing gearing or transmission which is relatively simple in construction and design, economical to manufacture, extremely reliable in operation, not readily subject to breakdown or malfunction and requires a minimum of maintenance and servicing.

Now in order to implement these and still further objects of the invention which will become more readily apparent as the description proceeds, the marine reversing gearing or transmission of the previously described species is manifested, according to the teachings of the present invention, by the features that the reversing gear set can be coupled with the pinion of the first stage by at least one reverse clutch. For the purpose of engaging and disengaging the forward and reverse clutches, a slowly rotating auxiliary drive having reversible direction of rotation can be connected with the drive shaft by means of a reversible movement blocking device or back stop.

Preferably a first central reversing gear can be coupled by at least said one reverse clutch with the pinion of the first stage and over a number of peripheral reversing gears can be continuously connected with a second central reversing gear.

This principle employing two central reversing gears is realized according to a first exemplary embodiment of the invention in that the second central reversing gear—as well as the single central reversing gear of the described known gearing or transmission—can be coupled with the drive shaft by means of a second reversing clutch, and that one of both central reversing gears meshes with two mutually parallel stationarily mounted intermediate gears which mesh with a respective peripheral reversing pinion. Each of these reversing pinions is fixedly connected with a coaxially arranged peripheral reversing gear which meshes with the other central reversing gear. With this embodiment, during forward or ahead travel, in other words with disengaged reverse clutches, all of the reversing and intermediate gears are at standstill.

According to another exemplary embodiment likewise having two central reversing gears and thus meshing peripheral reversing gears, the peripheral reversing gears are planetary gears mounted in a planetary gear support or planet carrier, and each planetary gear meshes with both central reversing gears. With this embodiment the connection of the second central reversing gear with the drive shaft can be non-releasable. There is thus dispensed with the use of a second rearward or reverse clutch. In this case the first and the second central reversing gears rotate, as do also the planetary gears during forward travel, when they are not used. The planetary gear support is stationary.

With both described embodiments the forward and reverse clutches are structured as self-synchronizing and engaging synchronous clutches. It is furthermore contemplated to place out of operation the synchronization device from externally of the gearing or transmission, and therefore, to positively ensure for the free countertravel.

Additionally, it is advantageous to connect the slowly rotating auxiliary drive with the drive shaft by means of a self-locking gearing and by means of a reverse movement blocking device or back stop which is self-synchronizing and engageable and having controllable locking means.

BRIEF DESCRIPTION OF THE DRAWINGS

The invention will be better understood and subjects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
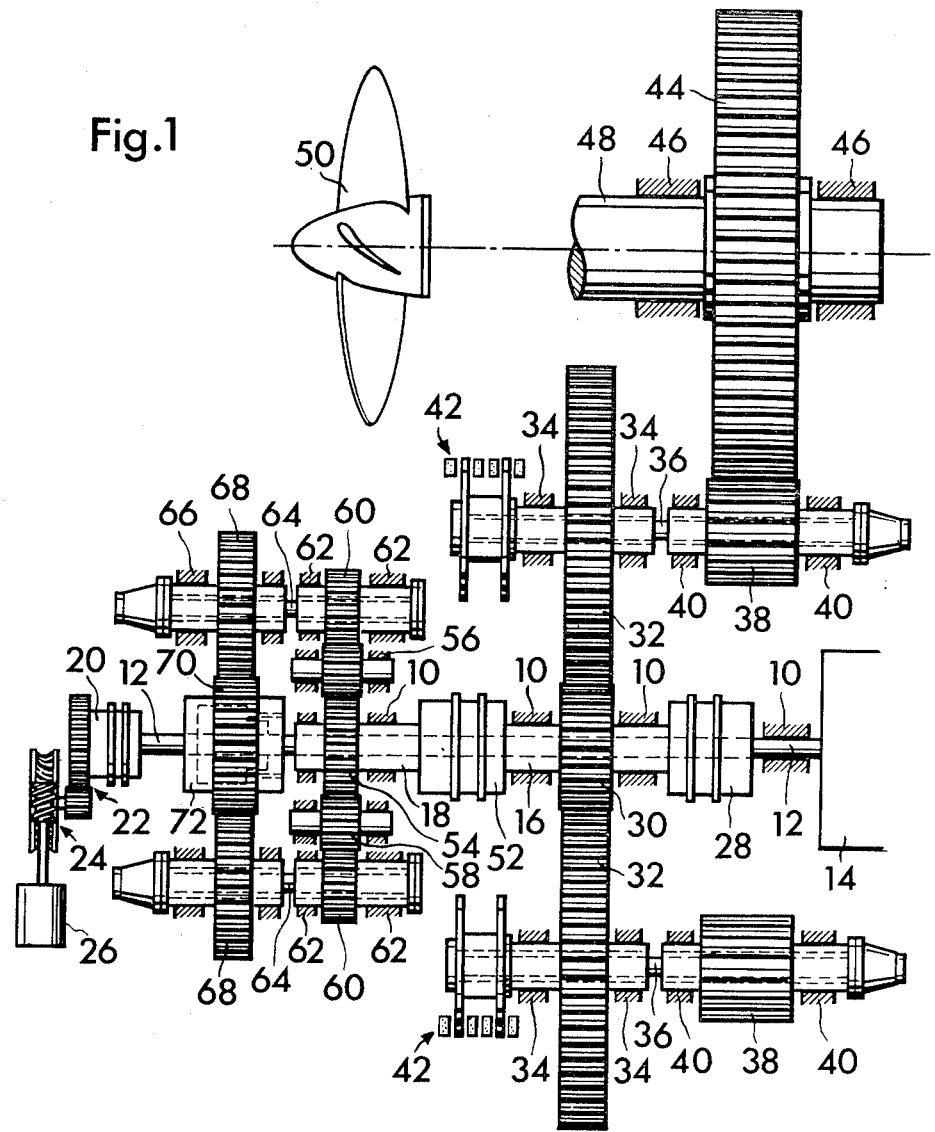
FIG. 1 illustrates a first exemplary embodiment of marine reversing gearing or transmission.

Describing now the drawings, there will first be discussed hereinafter the common features of the respective embodiments of FIGS. 1 and 2.

A drive shaft 12 is mounted in a row of aligned bearings 10. This drive shaft 12 is continuously coupled with a drive unit or machine 14, for instance a gas turbine. The drive shaft 12 extends through a first hollow shaft 16 and a second hollow shaft 18. Connected with the end of the drive shaft 12 which is remote from the drive machine 14 is an auxiliary drive 26, for instance an electric motor, the connection being accomplished by means of a back stop or return movement blocking device 20, a pair of spur gears 22 and a self-locking worm gearing 24.

The first hollow shaft 16 is connected with the drive shaft 12 by means of a clutch which is engaged during the forward or ahead travel and therefore conveniently designated hereinafter as the forward or ahead clutch 28. Attached to this hollow shaft 16 is a pinion 30 of a first gearing stage or gear train, this pinion 30 continuously meshing with two gears 32 of the first gearing stage or train. The gears 32 are mounted essentially parallel to one another in a respective pair of bearings 34 and rigidly connected by means of a respective torsion shaft or bar 36 with a respective pinion 38 of a second gearing stage or gear train. Both of the pinions 38 are mounted in a respective pair of bearings 40 and can be braked by a respective double disk brake 42 or equivalent structure and both mesh with a common gear 44 of the second gearing stage. This common gear 44 of the second stage is attached to a power take-off shaft 48 mounted in the bearings 46 and is continuously connected by means of such power take-off shaft 48 with the propeller 50 of the ship or vessel.

Figure 2:
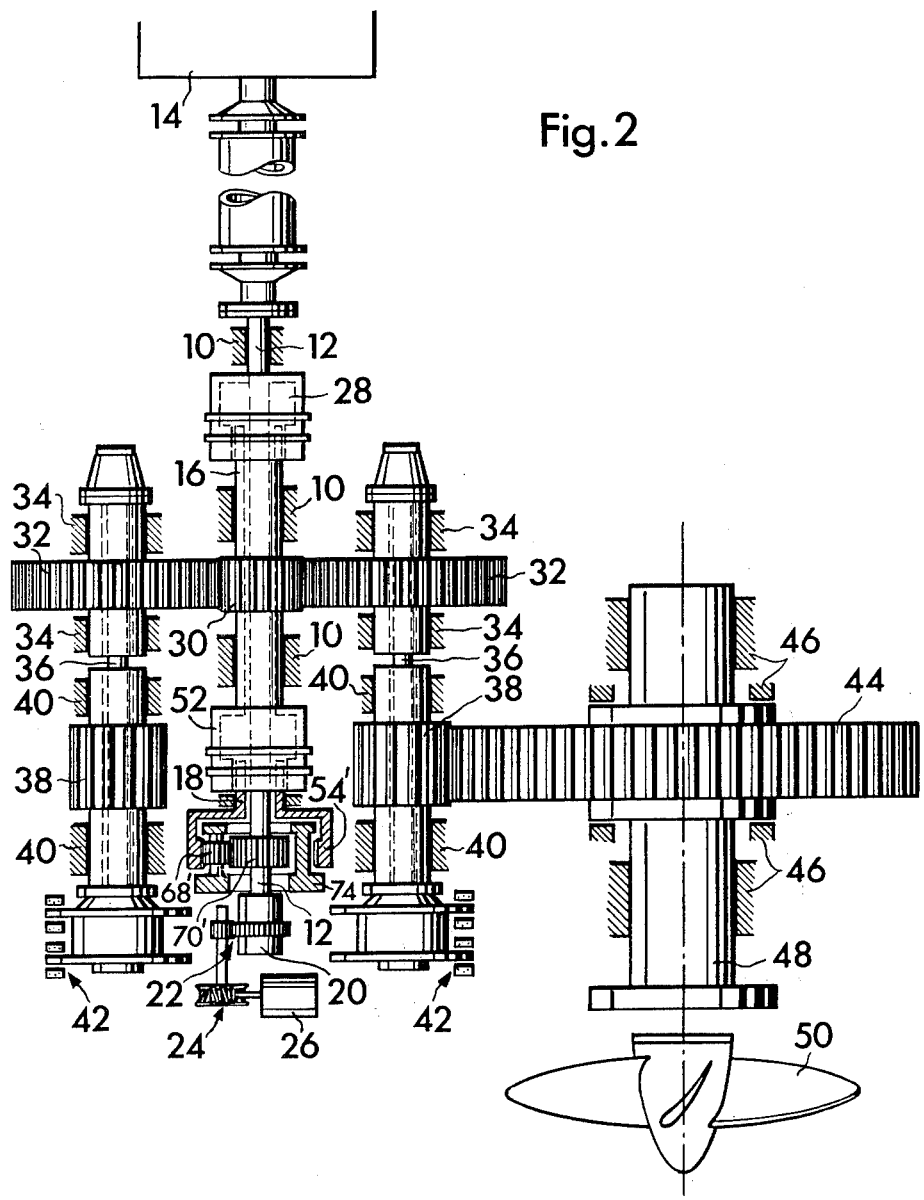
FIG. 2 illustrates a second exemplary embodiment of marine reversing gearing or transmission.

The gear 44 has been shown in FIGS. 1 and 2 laterally offset in order to simplify and improve the clarity of the illustration, something which should not be misleading in terms of the fact that it continuously meshes with both pinions 38.

The second hollow shaft 18 is connected with the first hollow shaft 16 by means of a clutch which can be engaged for the rearward or reverse rotation of the ship's propeller 50 and therefore has been conveniently designated hereinafter as the reverse or rearward clutch 52. Attached to the second hollow shaft 18 is a first central reversing gear 54. As to the construction and arrangement of this reversing gear 54 there exist differences between the respective embodiments of FIGS. 1 and 2, so that in the description to follow these will be separately considered and discussed.

According to the embodiment of FIG. 1, the first central reversing gear 54 comprises an externally toothed spur gear which meshes with two intermediate gears 58 which are stationarily or fixedly mounted in the bearings 56. Each of both intermediate gears 58 in turn meshes with a peripheral reversing pinion 60. These reversing pinions 60 are mounted essentially parallel to one another in stationary or fixed bearings 62 and rigidly connected by means of a respective torsion shaft or bar 64 with a respective peripheral reversing gear 68 likewise mounted in stationary or fixed bearings 66. Both of the peripheral reversing gears 68 mesh with a second central reversing gear 70 which can be engaged or coupled by a second reverse or rearward clutch 72 with the drive shaft 12.

With the embodiment shown in FIG. 2 a first central reversing gear 54' is provided with internal teeth and directly meshes with a set of peripheral reversing gears 68' which are mounted in the form of planetary gears in a planetary gear support or planet carrier 74 and mesh with a second central reversing gear 70' which is attached to the drive shaft 12. The planetary gear support or planet carrier 74 is stationary.

The mode of operation of both exemplary embodiments illustrated in FIGS. 1 and 2 of a maritime reversing gearing or transmission constructed according to the invention will be described hereinafter based upon the example of reversal of the vessel from full travel ahead to full rearward or astern travel:

1. The drive unit 14 is placed into its idle mode, the auxiliary drive 26 is started in its forward rotational direction and the back lock or reverse or return movement blocking device 20 is prepared for automatic locking action.
2. The disk brakes 42 are engaged as soon as:
   (a) the propeller rotational speed has dropped to a predetermined value, or
   (b) there has elapsed a predetermined time.
3. When the rotational speed of the drive shaft 12 has dropped below the low rotational speed of the reverse movement blocking device 20 such engages and automatically locks.
4. As soon as the reverse movement blocking device 20 is locked, then the auxiliary drive 26 is reversed from its forward mode to its backwards or reverse mode. At the same time the synchronization mechanism of the forward clutch 28 is placed out of operation, that of the reverse clutch 52, and if there is provided the reverse clutch unit 72, into operation.
5. During the reverse rotation of the drive shaft 12 through about 30° the forward clutch 28 disengages.
6. As soon as the forward clutch has disengaged then the auxiliary drive 26 is once again reversed and rotates the drive shaft 12 forwards. As a result, the reverse clutch 52 engages, as does likewise the clutch unit 72 if present.
7. As soon as the reverse clutch 52 has completely engaged, then the auxiliary drive 26 overcomes the idling moment of the drive unit 14 and thereby relieves the locking action of the reverse movement blocking device 20, so that such can be easily disengaged. Thereafter, the auxiliary drive 26 is brought to standstill.
8. The disk brakes 42 are released. For the case that the vessel continues to still travel forward, then the propeller 50 of the vessel strives to rotate forwardly and thus to rearwardly rotate the drive unit 14. This is prevented by the stopped auxiliary drive 26 in conjunction with the self-locking gearing 24 and the reverse movement blocking device 20.
9. Now the rotational moment or torque of the drive unit 14 can be increased. As soon as it exceeds the propeller torque then the turbine begins to rotate forwardly, the reverse movement blocking device 20 releases and the propeller 50 begins to rotate backwards.

The reversal from backwards to forwards occurs in the exact same steps, only the clutching functions of the forward and reverse clutches are interchanged.

While there are shown and described present preferred embodiments of the invention, it is to be distinctly understood that the invention is not limited thereto, but may be otherwise variously embodied and practiced within the scope of the following claims. Accordingly,

What I claim is:

1. A marine reversing gearing comprising:
   a drive shaft;
   a forward clutch essentially coaxially arranged with respect to said drive shaft;
   a first gearing stage comprising a pinion which can be operatively coupled by said forward clutch with said drive shaft;
   the first gearing stage further comprising two essentially mutually parallel arranged gears continuously meshing with said pinion of said first gearing stage;
   a second gearing stage including two gears;
   a power take-off shaft drivable by means of said two gears of said second gearing stage;
   a reversing gear set composed of a number of reversing gears;
   at least one reverse clutch essentially coaxially arranged with respect to said drive shaft;
   said reversing gear set being engageable and disengageable with the pinion of the first gearing stage by means of said at least one reverse clutch;
   a slow rotating auxiliary drive having reversible direction of rotation;
   a reverse movement blocking device; and
   said slow rotating auxiliary drive being connected by means of said reverse movement blocking device with said drive shaft for engaging and disengaging the forward and reverse clutches.

2. The marine reversing gearing as defined in claim 1, wherein:
   said reversing gear set comprises a first central reversing gear by means of which said at least one reverse clutch can be coupled with the pinion of the first gearing stage;
   a second central reversing gear;
   a number of peripheral reversing gears; and
   said first central reversing gear being connected by said number of peripheral reversing gears with said second central reversing gear.

3. A marine reversing gearing comprising:
   a drive shaft;
   a forward clutch essentially coaxially arranged with respect to said drive shaft;
   a first gearing stage comprising a pinion which can be operatively coupled by said forward clutch with said drive shaft;
   the first gearing stage further comprising two essentially mutually parallel arranged gears continuously meshing with said pinion of said first gearing stage;
   a second gearing stage including two gears;
   a power take-off shaft drivable by means of said two gears of said second gearing stage;
   a reversing gear set composed of a number of reversing gears;
   at least one reverse clutch essentially coaxially arranged with respect to said drive shaft;
   said reversing gear set being engageable with the pinion of the first gearing stage by means of said at least one reverse clutch;
   a slow rotating auxiliary drive having reversible direction of rotation;
   a reverse movement blocking device;
   said slow rotating auxiliary drive being connected by means of said reverse movement blocking drive with said drive shaft for engaging and disengaging the forward and reverse clutches;
   said reversing gear set comprises a first central reversing gear by means of which said at least one reverse clutch can be coupled with the pinion of the first gearing stage;
   a second central reversing gear;
   a number of peripheral reversing gears;
   said first central reversing gear being connected by said number of peripheral reversing gears with said second central reversing gear;
   a second reverse clutch for coupling the second central reversing gear with the drive shaft;

one of both central reversing gears meshing with two mutually parallel stationarily mounted intermediate gears;

said number of peripheral reversing gears including respective peripheral reversing pinions;

each of said two mutually parallel stationary intermediate gears meshing with a respective one of the peripheral reversing pinions; and each of said peripheral reversing pinions being rigidly connected with a respective coaxially arranged one of said peripheral reversing gears which meshes with the second central reversing gear.

4. A marine reversing gearing comprising:

a drive shaft;

a forward clutch essentially coaxially arranged with respect to said drive shaft;

a first gearing stage comprising a pinion which can be operatively coupled by said forward clutch with said drive shaft;

the first gearing stage further comprising two essentially mutually parallel arranged gears continuously meshing with said pinion of said first gearing stage;

a second gearing stage including two gears;

a power take-off shaft drivable by means of said two gears of said second gearing stage;

a reversing gear set composed of a number of reversing gears;

at least one reverse clutch essentially coaxially arranged with respect to said drive shaft;

said reversing gear set being engageable with the pinion of the first gearing stage by means of said at least one reverse clutch;

a slow rotating auxiliary drive having reversible direction of rotation;

a reverse movement blocking device;

said slow rotating auxiliary drive being connected by means of said reverse movement blocking device with said drive shaft for engaging and disengaging the forward and reverse clutches;

said reversing gear set comprises a first central reversing gear by means of which said at least one reverse clutch can be coupled with the pinion of the first gearing stage;

a second central reversing gear;

a number of peripheral reversing gears;

said first central reversing gear being connected by said number of peripheral reversing gears with said second central reversing gear;

planetary gear support means;

said peripheral reversing gears comprise planetary gears mounted in said planetary gear support means; and each of said planetary gears meshing with both central reversing gears.

5. A marine reversing gearing comprising:

a drive shaft;

a forward clutch essentially coaxially arranged with respect to said drive shaft;

a first gearing stage comprising a pinion which can be operatively coupled by said forward clutch with said drive shaft;

a first gearing stage further comprising two essentially mutually parallel arranged gears continuously meshing with said pinion of said first gearing stage;

a second gearing stage including two gears;

a power take-off shaft drivable by means of said two gears of said second gearing stage;

a reversing gear set composed of a number of reversing gears;

at least one reverse clutch essentially coaxially arranged with respect to said drive shaft;

said reversing gear set being engageable with the pinion of the first gearing stage by means of said at least one reverse clutch;

a slow rotating auxiliary drive having reversible direction of rotation;

a reverse movement blocking device;

said slow rotating auxiliary drive being connected by means of said reverse movement blocking device with said drive shaft for engaging and disengaging the forward and reverse clutches; and said forward and reverse clutches each comprise self-synchronizing and engageable synchronous clutches.

6. A marine reversing gearing comprising:

a drive shaft;

a forward clutch essentially coaxially arranged with respect to said drive shaft;

a first gearing stage comprising a pinion which can be operatively coupled by said forward clutch with said drive shaft;

the first gearing stage further comprising two essentially mutually parallel arranged gears continuously meshing with said pinion of said first gearing stage;

a second gearing stage including two gears;

a power take-off shaft drivable by means of said two gears of said second gearing stage;

a reversing gear set composed of a number of reversing gears;

at least one reverse clutch essentially coaxially arranged with respect to said drive shaft;

said reversing gear set being engageable with the pinion of the first gearing stage by means of said at least one reverse clutch;

a slow rotating auxiliary drive having reversible direction of rotation;

a reverse movement blocking device;

said slow rotating auxiliary drive being connected by means of said reverse movement blocking device with said drive shaft for engaging and disengaging the forward and reverse clutches; and self-locking gearing means for connecting the auxiliary drive with the reverse movement blocking device.

7. The marine reversing gearing as defined in claim 6, wherein:

said reverse movement blocking device is self-synchronizing and comprises control means bringing about an automatic clutching action.

* * * * *